United States Patent [19]

Guadard et al.

[11] 4,326,504
[45] Apr. 27, 1982

[54] TEXTILE SOLAR COLLECTOR

[75] Inventors: Yves Guadard; Henri Guillemaud, both of Lyons, France

[73] Assignee: Rhone-Poulenc-Textile, Paris, France

[21] Appl. No.: 52,443

[22] Filed: Jun. 26, 1979

[51] Int. Cl.³ .............................................. F24J 3/02
[52] U.S. Cl. .................................. 126/449; 126/417; 126/901; 126/432
[58] Field of Search ............... 126/417, 449, 901, 433, 126/429, 431, 441, 432; 165/46, 133; 428/280, 286, 287, 288, 340, 97, 113, 170, 234, 235, 300, 301

[56] References Cited

U.S. PATENT DOCUMENTS

| 2,123,474 | 7/1938 | Redman | 428/286 |
| 2,482,237 | 9/1949 | Berglund | 428/280 |
| 3,485,705 | 12/1969 | Harmon | 428/280 |
| 3,616,031 | 10/1971 | Fleissner | 428/280 X |
| 3,870,592 | 3/1975 | Brock et al. | 428/301X |
| 3,874,441 | 4/1975 | Duchene | 126/449 |
| 3,936,555 | 2/1976 | Smith | 428/280 |
| 4,085,732 | 4/1978 | Hysom | 126/449 |
| 4,118,531 | 10/1978 | Hauser | 428/280 X |
| 4,119,083 | 10/1978 | Heyen et al. | 126/449 |
| 4,175,542 | 11/1979 | Duchene | 126/449 |
| 4,186,721 | 2/1980 | Whitman | 126/449 |

FOREIGN PATENT DOCUMENTS 2619467 11/1977 Fed. Rep. of Germany ...... 126/433

Primary Examiner—Larry Jones
Attorney, Agent, or Firm—Sherman & Shalloway

[57] ABSTRACT

Solar collector employing a liquid collecting medium. A textile collection surface of which the thickness possesses different densities is employed to carry the medium. These densities are such that the densities increase from the surface exposed to the sun to the opposite surface, in order to enable the liquid to run in the upper thickness. The textile collecting surface consists of at least one nonwoven textile thickness.

2 Claims, 2 Drawing Figures

TEXTILE SOLAR COLLECTOR

BACKGROUND OF THE INVENTION

1. Field of the Invention

The present invention relates to solar collectors and more particularly to a textile solar collector wherein the collection fluid passes through a textile layer.

2. Description of the Prior Art

The principle of operation of a solar collector is well known: the solar energy is absorbed by the collector which converts it into heat and the heat is transferred to a moving fluid. The collectors are generally solid, in the form of a black absorbent plate placed inside a sealed frame covered with a pane of glass, a space being left between the absorbent plate and the pane of glass of the frame to create a greenhouse effect. The moving fluid, which is generally water, passes through a set of tubes located within the absorbent plate. The reverse side of the plate, which is not exposed to the sun, is insulated in the majority of cases in order to avoid heat losses. According to this principle, the energy of the sun, absorbed by the plate, is transferred to the tubes and then to the moving liquid which can either be used immediately or stored for subsequent use.

This type of collector is generally expensive and difficult to construct; described herein is a relatively simple and inexpensive solar collector.

SUMMARY OF THE INVENTION

The present invention relates to a solar collector using a flowing collecting liquid, characterized in that the solar collector consists of a textile surface of which the thickness possesses different densities which are such that these densities increase from the surface exposed to the sun to the opposite surface, in order to enable the liquid to run over the upper thickness of less density and enhance solar collection. The textile surface of the collector according to the invention consists of at least one nonwoven textile obtained either by the dry process starting with fibres, or by extruding molten masses in order to produce a surface of continuous filaments. In the embodiment employing a single surface of nonwoven material, the density variation is achieved, for example, by needed felting. In the embodiment employing several nonwoven layers, each layer is superposed over another in such a way that the least dense nonwoven layer is on the same side as the face exposed to the sun. If desired, the nonwoven textile layer or portion of variable density which is closest to the portion exposed to the sun can also be lightly impregnated with synthetic resin in order to facilitate the laminar flow of the liquid and its distribution in and on the layer exposed to the sun. The surface of the face exposed to the sun can also be coated with resin by spraying; in this case, the distribution of the liquid flow is uniform in the thickness of the nonwoven and laminar at the surface. In the needle-felted nonwoven embodiment, the face exposed to the sun is preferably the exit face of the needles. If the superposition of several nonwovens is involved, the least dense web preferably has the smallest thickness as compared to the thickness of the other layers. It is also possible to superpose a nonwoven and a woven fabric or a knitted fabric, the nonwoven surface always being placed on the side facing the sun. On the surface, it is also possible to arrange a spread-out sliver or thin layer of crimped or uncrimped continuous yarns to collect the heat from the sun, the reverse side consisting of a nonwoven, a woven fabric or a knitted fabric. The term "density" is understood as meaning the ratio of the surface area occupied by the textile to the weight of the said textile.

The textile is preferably a material which resists sunlight and particularly ultraviolet light; synthetic textiles based on polymers, copolymers or a mixture of polymers, or obtained by spinning the latter in a side-by-side or core-sheath arrangement, are preferably used. The texture of the nonwoven material must enable the liquid to be distributed as well as possible so that it circulates, by running, as near as possible to the surface of the collector. In the event of accidental excess water pressure, the unit must make it possible to absorb the additional amount of water in order to avoid a strong laminar flow on the surface. If the density of the textile were uniform, the water would run in that part of the textile which is opposite the part exposed to the sun and the result obtained would be less satisfactory; furthermore, in the event of excess pressure, the water diffuses into the thickness and flows normally, virtually without distrubing the operation of the collector.

Of course, the color of the textile solar collector of the present application is black for maximum absorption of the solar energy; this black color, which is preferably dull, can be achieved either by spun dyeing during the manufacture of the textiles, or by delustring the textile during its manufacture and then subsequent dyeing, or subsequent dyeing using a suitable dyestuff formulation. The dull black coloration chosen must be such that it permits a maximum absorption coefficient for a minimum emission coefficient, in order to avoid heat losses. The nonwoven can be impregnated, before use, with a wetting product.

The textile collector is placed in an insulated frame in the same way as the solid collectors, a space being kept between the surface of the collector and the pane of glass of the frame; a liquid feed is provided at one end of the frame and a discharge is provided at the other end. The inclination of the frame depends on the region in which it is located, and is set so as to benefit from maximum insulation; moreover, the collector can optionally be designed in such a way that, when mounted on a movable frame, the rotation of the latter follows the movements of the sun from east to west; in the evening, the frame is repositioned to face the east in order to benefit from the rising sun on the following day.

The water feed device must be designed so as to feed the water to the collector in a laminar manner, without turbulence.

BRIEF DESCRIPTION OF THE DRAWING

These features of the invention as well as others will become apparent to those skilled in the art by referring to the accompanying drawings in which.

DETAILED DESCRIPTION OF THE INVENTION

Figure 1:
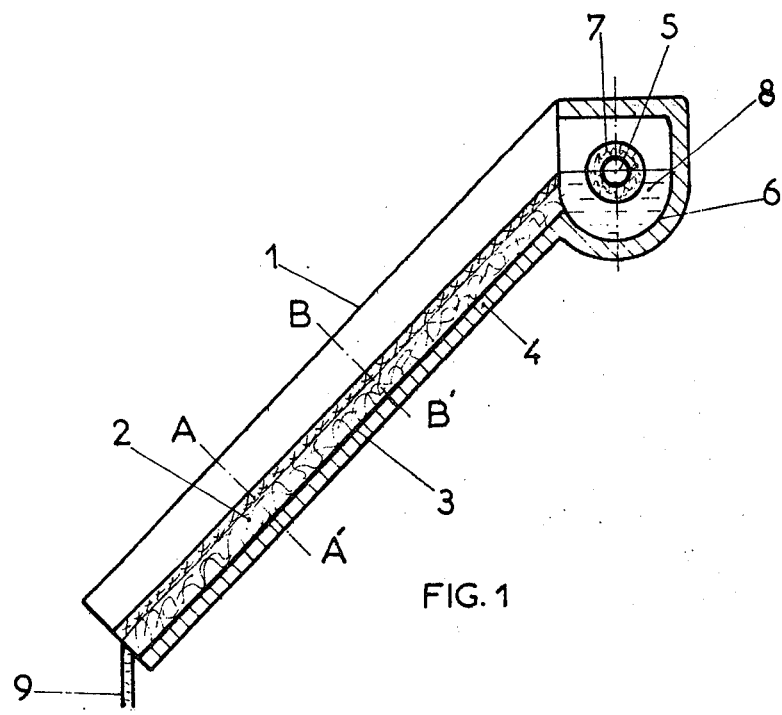
FIG. 1 is a sectional view of a solar textile collector according to the invention and FIG. 2 is an exploded sectional view taken along sectional lines AA'-BB'.

FIG. 1 shows the pane of glass 1, the textile solar collector 2 according to the invention, the bottom of the frame 3, the insulating layer 4, and the water inlet 5 in a trough 6. The water inlet 5 is surrounded by a textile sleeve 7, which is preferably nonwoven. The water 8 diffuses through the sleeve 7 and the edge of the trough is located at the level of the less dense thickness of the textile collector. The heated water flows through the outlet pipe 9. In operation, the level of the water 8 is kept so that it enables the running water to be distributed uniformly in the less dense upper part of the textile collector 2; during operation, the water gradually warms and and flows to and through the pipe 9.

Figure 2:
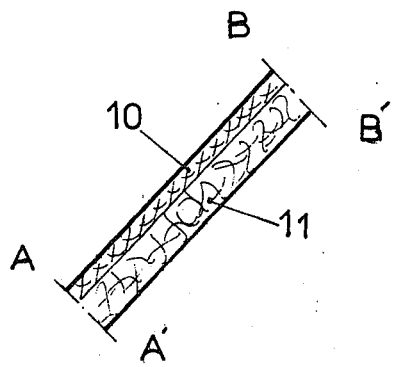

FIG. 2 is an enlargement of the textile surface of FIG. 1, along the section AA'/BB', showing the upper layer 10, in and on which the liquid flows. The upper layer 10 has a smaller thickness than the inner layer 11. The inner layer 11 has a greater density than the upper layer 10. It is contemplated that the inner layer 11 may have a variable density, the density increasing from the surface in contact with the upper layer 10 to the surface in contact with the frame bottom 3. In such an embodiment, the density of the surface of inner layer 11 which is in contact with upper layer 10 must be greater than the density of upper layer 10.

The water heated by means of a collector of this kind can be used for any domestic, industrial or agricultural purpose, for example for heating swimming-pool water, bath water or water for household use. Of course, the type of textile surface of the collector depends on the type of use.

The following examples illustrate the present application without limiting it.

EXAMPLE 1

A solar textile collector comprising a 2 meters by 1 meter panel, of which the surface exposed to the sun is composed of a nonwoven weighing 60 g/m² which is not needle-felted, and of which the opposite face is composed of a nonwoven weighing 150 g/m² which is needle-felted at 50 needlepricks/cm², penetration of the needles 16 mm, is placed in a device such as that shown in FIG. 1.

The two nonwovens are obtained in accordance with a known process by the extrusion and web formation of continuous poly-(ethylene glycol) terephthalate filaments having a guage of 13 dtex/strand; the whole has a thickness of 3 millimeters after positioning, the nonwovens being dyed black by spun dyeing under the following conditions:

A mixture of 0.4% of OP wax (HOECHST) and 0.08% of Vulcan Black 6 (CABOT CORP.) is prepared; this mixture is introduced at the rate of 0.48% into the melter containing the poly-(ethylene glycol) terephthalate which is then extruded in the form of filaments.

The frame, set up in this way, is inclined at 45° relative to the vertical and is fed with water: flow rate 200 liters per hour, flow 2 meters/minute; the water fed in at 20° C. warms up to 25° C. and is used for supplying a swimming-pool.

EXAMPLE 2

A solar textile collector consisting of a 1 meter by 1 meter panel, of which the surface exposed to the sun is composed of a nonwoven weighing 50 g/m² which is not felted, and of which the opposite face is composed of a nonwoven weighing 110 g/m² which is needle-felted at 50 needlepricks/cm², penetration of the needles 16 mm, and is impregnated with a melamine/formaldehyde resin, is placed in a device such as that described in FIG. 1.

The two nonwovens are obtained in accordance with a known process by the extrusion and web formation of continuous poly-(ethylene glycol) terephthalate filaments having a guage of 8.8 dtex/strand; the whole has a thickness of 3 millimeters after positioning, the nonwovens being dyed black under the following conditions:

desizing in an autoclave at 80° C. for 20 minutes in a bath containing 2 grams/liter of sodium carbonate and 0.5 gram/liter of DETAGIL P 30 (PHONE-POULENC-INDUSTRIES), and rinsing, following by dyeing in the same apparatus in a bath containing: 1 cm³/liter of acetic acid, 1 cm³/liter of SUNAPTOL LT (PUK), 8% of the black dyestuff TERASIL SL (CIBA GEIGY) and 4% of the black dyestuff FORON S 2 BL (SANDOZ). (The percentages are given relative to the weight of the material).

Dyeing by liquor circulation for 1 hour at 130° C.; then stripping in a bath containing: 6 cm³/liter of 36° Baumé strength sodium hydroxide solution, 2 grams/liter of sodium dithionite and 1 cm³/liter of SUNAPTOL O (PUK), for 30 minutes at 80° C.; then rinsing followed by stenter drying at 150° C.

The frame, set up in this way, is inclined at 45° relative to the vertical and is fed with water: flow rate 200 liters per hour, flow 2 meters per minute; the water fed in at 20° C. is warmed up to 25° C. and is used for supplying a swimming-pool as in Example 1.

EXAMPLE 3

A solar collector consisting of a nonwoven of 13 dtex/strand continuous poly-(ethylene glycol) terephthalate filaments, which weighs 120 g/m², is dyed black in accordance with the process of Example 2, is sprayed with acrylic/vinyl resin and has a total weight of 140 grams/m², is arranged in a device such as that shown in FIG. 1.

With the frame inclined at 45° and the size of the collector being: two square meters (2 m × 1 m), 40 liters of water were run with recycling and could be heated from 25° C. to 40° C. in the course of two hours.

What is claimed is:

1. In a solar collector employing a running liquid to transmit heat collected from the sun comprising:
   (a) a frame having an inlet and an outlet; and
   (b) a textile layer supported within the frame, the textile layer being exposed to the sun and the collecting liquid entering the inlet being dispersed over the textile layer and withdrawn through the outlet, the improvement wherein said textile layer comprises two nonwoven textile layers of continuous superimposed filaments, each layer having a density different from that of the other layer, the nonwoven layer of lower density being the surface exposed to the sun and being impregnated with a synthetic resin.

2. A solar collector employing a running liquid to transmit heat collected from the sun comprising:
   (a) a frame having an inlet and an outlet;
   (b) a textile layer supported within the frame, the textile layer being exposed to the sun and the collecting liquid entering the inlet being dispersed over the textile layer and withdrawn through the outlet;
   (c) a trough located at the upper edge of said frame, the trough having the inlet disposed therein and positioned higher than the outlet such that collecting liquid entering the inlet is dispersed into the trough, flows due to gravity over the textile layer and is exited through the outlet, a textile sleeve being disposed around the inlet for diffusing the collecting liquid into the trough; and (d) said textile layer comprising a nonwoven textile layer of continuous synthetic filaments, the textile layer having a density which varies along the thickness of the layer, the density of the surface of the textile layer exposed to the sun being less than the density of the opposing surface of the textile layer whereby the collecting liquid flows within an upper portion of the textile layer having the lesser density and exposed to the sun.

* * * * *